(12) United States Patent
Niederman et al.

(10) Patent No.: US 6,520,572 B1
(45) Date of Patent: Feb. 18, 2003

(54) METHOD AND APPARATUS FOR A DEPLOYABLE COVER

(75) Inventors: Robert Raymond Niederman, Dayton, OH (US); Jeffrey Allen Welch, Washington, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/692,288

(22) Filed: Oct. 19, 2000

(51) Int. Cl.[7] .............................. B60J 7/06; B60R 21/22
(52) U.S. Cl. ..................... 296/219; 280/730.1; 180/281
(58) Field of Search ............................... 296/212, 214, 296/219; 280/730.1, 753; 180/281

(56) References Cited

U.S. PATENT DOCUMENTS

| | | | | |
|---|---|---|---|---|
| 3,804,435 A | * | 4/1974 | See et al. | |
| 5,167,296 A | * | 12/1992 | Schreier | 296/223 X |
| 5,707,075 A | * | 1/1998 | Kraft et al. | 280/753 X |
| 5,865,462 A | * | 2/1999 | Robins et al. | 280/730.2 |
| 6,189,960 B1 | * | 2/2001 | Mumura et al. | 296/214 X |
| 6,220,625 B1 | * | 4/2001 | Wallner et al. | 280/753 X |

* cited by examiner

Primary Examiner—Dennis H. Pedder
(74) Attorney, Agent, or Firm—Kathryn A. Marra (57) ABSTRACT

A cover assembly including a cover member and a cover displacement mechanism is provided. The cover displacement mechanism positions the cover within a vehicle about an opening formed in the vehicle. The cover selectively separates an interior of the vehicle from an exterior of the vehicle at the opening.

16 Claims, 11 Drawing Sheets

METHOD AND APPARATUS FOR A DEPLOYABLE COVER

TECHNICAL FIELD

The present invention relates generally to vehicle restraint systems, and more particularly to an apparatus and deployable member for obstructing an opening in a vehicle.

BACKGROUND OF THE INVENTION

A vehicle generally includes a plurality of windows or other transparent members which permit a light pathway from an interior of the vehicle to an exterior. These windows or transparent members allow the occupant to see outside the vehicle in order to drive the vehicle. In addition, these light transmission portions of the vehicle also provide a means for allowing air and light to enter the vehicle, as well as the observation of the surrounding scenery. The interior of the vehicle includes a compartment for containing, for example, occupants and/or stowed items.

These windows or other transparent members are installed in corresponding openings in the vehicle body. For example, a sunroof is formed in a roof of the vehicle above the interior compartment.

A sunroof includes a sunroof cover which is either locatable in an open or closed position, or fixed in a closed position.

The sunroof cover is positionable by activation of an occupant. Occupant activation of the sunroof cover may be by manual mechanical means or by automated electronic means.

SUMMARY OF THE INVENTION

A method and apparatus for deploying a cover over an opening in a vehicle.

The cover displacement mechanism positions the cover within a vehicle about an opening formed in the vehicle. The cover selectively separates an interior the vehicle from an exterior of the vehicle at the opening.

The cover member is constructed of sealed plastic, rubber, fabric, or a similar resilient material. The cover member is retractable and compressible and is thusly stored adjacent the opening in a storage housing. The cover member includes a first end and an opposing second end. The first end is fixed to and within the storage housing. The second end is attached to drive cables.

The drive cables extend from the second end of the cover about the opening to a pulley system. The pulley system is mechanized by an actuator such that the pulley system is selectively rotatable. The pulley system is disposed opposite the opening relative the storage housing.

Upon activation of the actuator, a pulley rotates, gathering the drive cables thereabout. Accordingly, the second end of the cover is drawn towards the pulley, across the opening. Thus, the opening is covered by the deployable cover.

In an exemplary embodiment, the drive mechanism includes a signaling means for communicating to the actuator when deployment of the cover is desired.

The cover is cushioned, for example, by inflation of a gas. The cover includes an interior which receives gas from an inflator upon deployment of the cover thus providing cushioning thereof.

The cover deployment assembly of the present invention provides for the selective, rapid, and automatic deployment of a cover across an opening formed in a vehicle.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example only, with reference to the accompanying drawings in which.

DESCRIPTION OF THE PREFERRED EMBODIMENT

Figure 1:
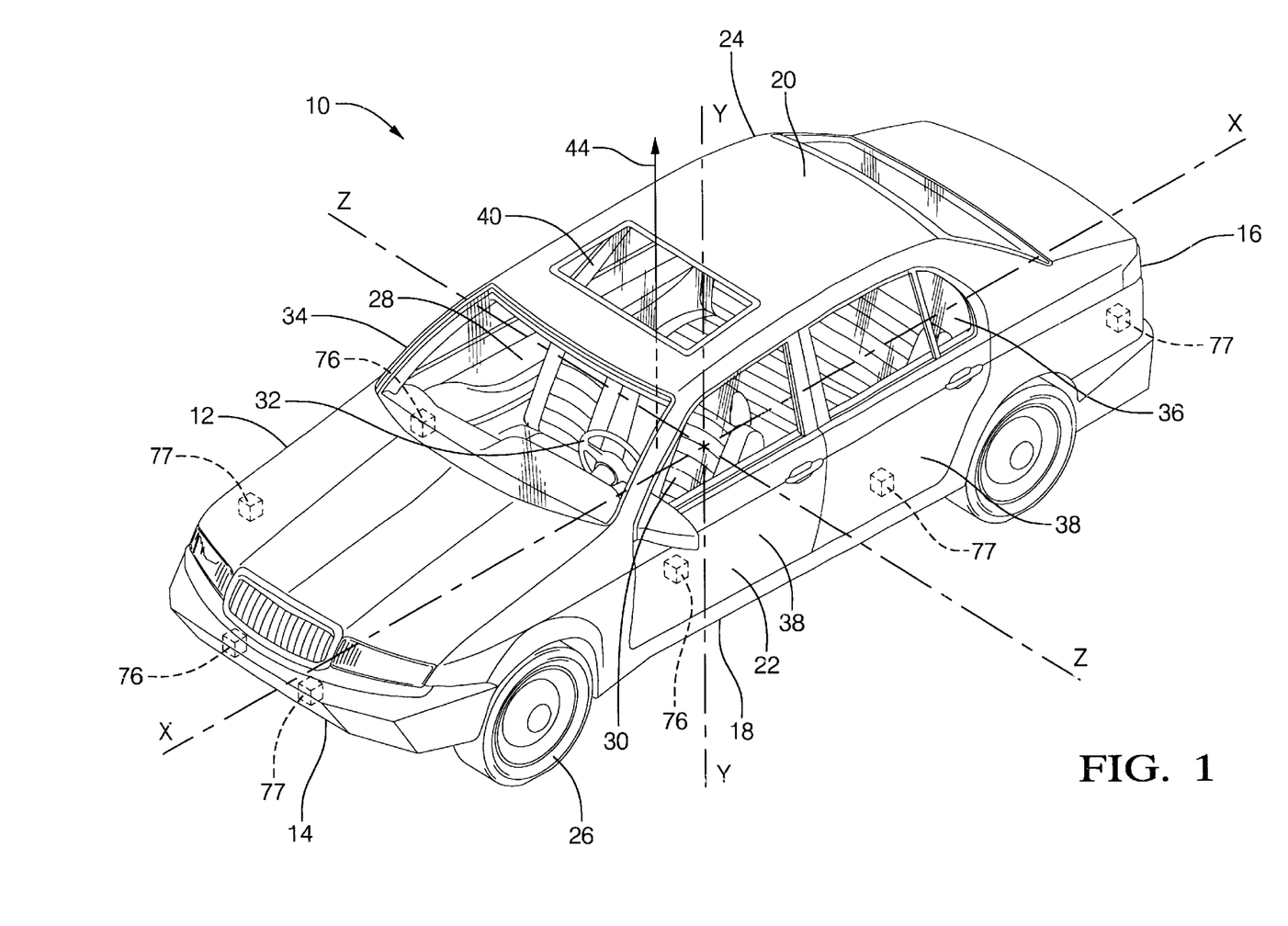
FIG. 1 is a perspective view of a vehicle in a first position.

FIG. 1 shows a vehicle 10. Vehicle 10 includes a body 12.

Body 12 has opposing front and rear ends 14 and 16. Body 12 also has a floor portion 18 located in between front and rear ends 14 and 16. A roof 20 is located opposite floor portion 18, in between front and rear ends 14 and 16. Body 12 also has sides 22 and 24.

Vehicle 10 has wheels 26 located, in one embodiment, proximate floor portion 18.

Vehicle 10 further includes a passenger compartment 28. Compartment 28 is formed within body 12 at an interior of the vehicle. Compartment 28 is located in between front and rear ends 14 and 16 and in between floor portion 18 and roof 20.

Compartment 28 is generally configured for providing a means for carrying a driver and occupants of vehicle 10. Compartment 28 generally includes occupant amenities, facilitating the carrying of the driver and occupants; for example, seats 30 and a steering wheel 32 are located within compartment within compartment 28. Vehicle 10 also includes a windshield 34, preferably located toward front end 14. Compartment 28 further has windows 36 formed therein, adjacent windshield 34 at sides 22 and 24.

Vehicle 10 also has a plurality of doors 38. Doors 38 allow for egress and ingress of compartment 24.

Roof 20 includes an opening 40. Opening 40 is a sunroof opening and a transparent member 42 is inserted therein. Transparent member 42 is removably attachable to roof 20 at opening 40. A user manually attaches transparent member 42 to roof 20 to close opening 40. Any selectively releasable latching means is used to secure transparent member 42 to roof 20 at opening 40, for example, snaps, bolts, screws, clasps, etc.

Alternatively, transparent member 42 is disposed integrally within roof 20, and transparent member 42 is then mechanically actuated from an open position to a closed position, either manually or automatically by, for example, an electronic control.

In any of the embodiments discussed herein or those further contemplated within the scope of the present invention, transparent member 42 is used to entirely or partially close opening 40 by activation by the vehicle occupants.

In addition, and in accordance with a predetermined threshold event, a cover deployment assembly 50 (FIGS. 1–4, 6–8, 17 and 18) will be activated. In an exemplary embodiment, cover employment assembly 50 and its associated deployable cover are positioned within the exterior surface of the vehicle and the interior trim of the vehicle. Thus, the same is not viewable by an occupant when they are not in their deployed state.

Accordingly, and in order to prevent the ejection of an occupant from the vehicle pathway 44 of opening 40 is blocked by cover deployment assembly 50, as will be disclosed herein.

Cover deployment assembly 50, as shown in FIGS. 1–4, 6–8, 17, and 18, is disposed at an interior 21 (FIG. 5) of roof 20 about opening 40. In an exemplary embodiment, cover deployment assembly 50 is mounted to a cross structural member 51 that traverses from one end of the vehicle frame to the other in close proximity to opening 40. Of course, cover deployment assembly 50 maybe mounted to other structural members and or locations. Cover deployment assembly 50 provides a means for providing a force to deploy the deployable cover of the present application.

In an exemplary embodiment, cover deployment assembly 50 includes a pulley system 54 mounted rotatably at the interior of roof 20. Pulley system 54 is mounted in between opening 40 and rear end 16.

Figure 9:
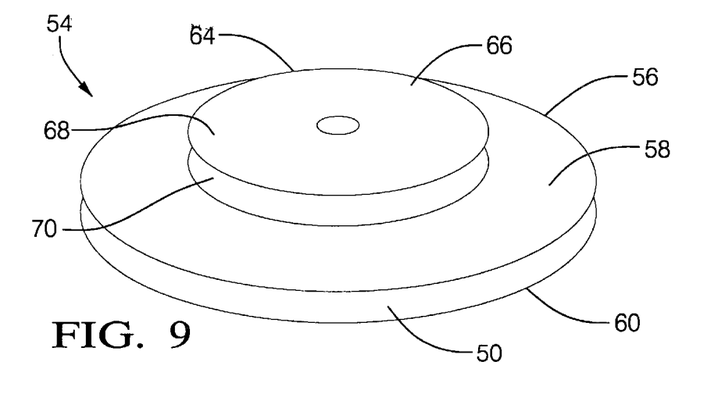
FIG. 9 is a perspective view of the pulley assembly.
Figure 10:
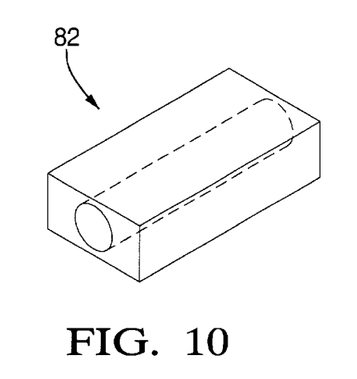
FIG. 10 is a perspective view of one embodiment of a cable guide.
Figure 11:
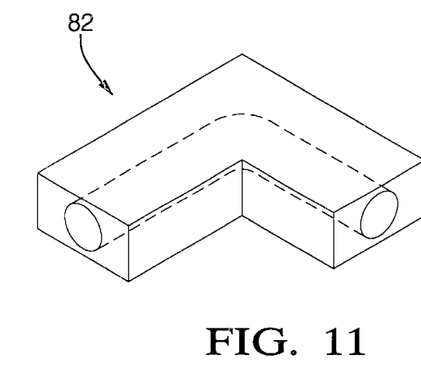
FIG. 11 is a perspective view of another embodiment of the cable guide of FIG. 10.
Figure 12:
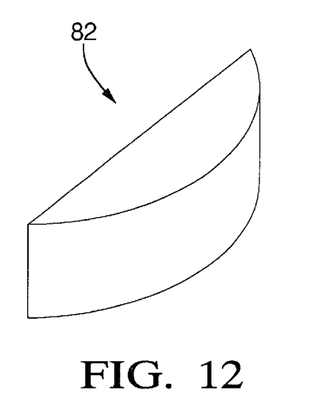
FIG. 12 is a perspective view of another embodiment of the cable guide of FIG. 10.
Figure 13:
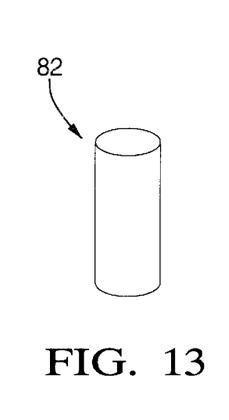
FIG. 13 is a perspective view of another embodiment of the cable guide of FIG. 10.
Figure 14:
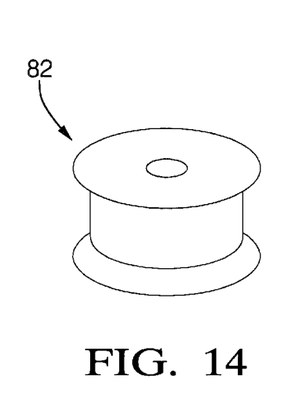
FIG. 14 is a perspective view of another embodiment of the cable guide of FIG. 10.

Referring now specifically to FIG. 9, pulley system 54 includes a first portion 56. First portion 56 is disk-shaped having a face 58 and an outer edge 60 formed about face 58. A retainment groove 62 is formed at edge 60 and extends circumferentially about first portion 56. First portion 56 may be circular, oval, or any curvilinear shape or any other shape suitable for the applications herein set forth.

Pulley system 54 further includes a second portion 64. Second portion 64 is attached to first portion 56 at face 58. Second portion 64 is shaped similarly to first portion 56. Second portion 64 has a face 66 and an edge 68 formed thereabout. A retainment groove 70 is formed about second portion 64 at edge 68.

First and second portions 56 and 64 are circular in shape and are rigidly attached concentrically with one another. Second portion 64 is sized smaller than first portion 56; this allows a greater amount of cable to be wound by portion 64 as portions 56 and 64 are angularly manipulated by actuator mechanism 74.

Referring now to FIGS. 1–9, cover deployment assembly 50 further includes an actuator 72. Actuator 72 is disposed at the interior of roof 20 proximate pulley system 54. Actuator 72 includes an actuator mechanism 74. Actuator 72 is communicatively connected with a sensor/processor 76 and receives signals therefrom.

An actuator cable 78 is attached at one end to an actuation actuator mechanism 74 of actuator 72. Actuator cable 78 is attached to actuator mechanism 74 and extends therefrom towards pulley system 54. Actuator mechanism 74 provides a means for pulling actuator cable in a first direction so as to facilitate the angular movement of the first and second portions of pulley system 54. For example, and referring to FIG. 19, actuator mechanism 74 may be a pyrotechnic device 75 wherein a projectile 77 being secured to actuator cable 78 at one end is fired through a passageway 79 thereby affecting the angular movement of pulley system 54.

Figures 18, 19:
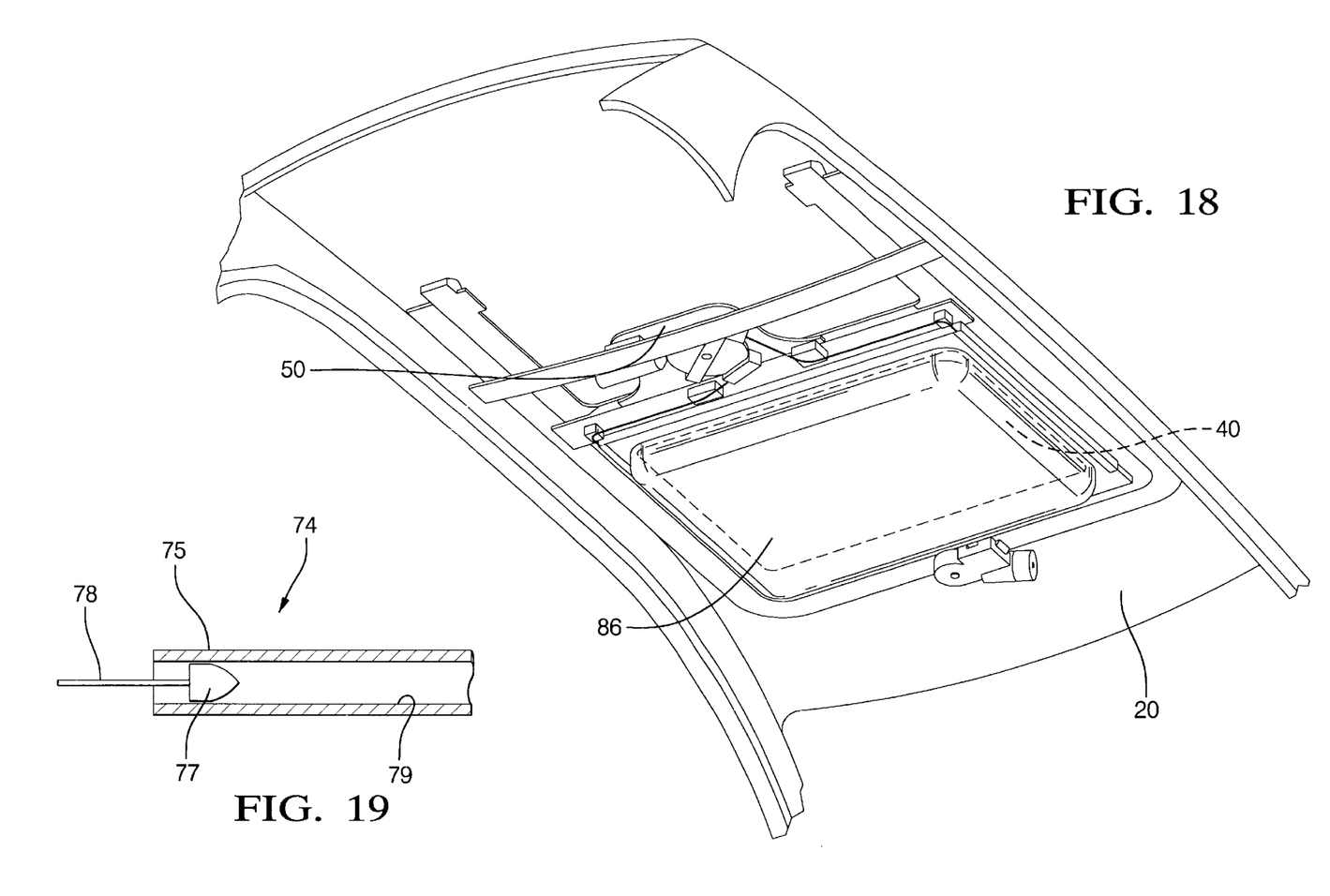
FIG. 18 is a lower perspective view of the cover deployment assembly of FIG. 17.
FIG. 19 is a cross section view of an actuating mechanism.

In yet another alternative, projectile 77 is secured directly to cables 80 and facilitates the deployment of deployable cover 86. In this embodiment, a pair of projectiles may be used (i.e. for each cable 80) or alternatively projectile 77 may be secured directly to both cables. Thus, and after projectile 77 is fired through a passageway cables 80 will cause the cover to be deployed.

Alternatively, actuator mechanism 74 may be a device similar to a seatbelt hypertensioner or an electrically activated motor or solenoid device that effectively pulls actuator cable 78 in order to translate angular movement to pulley system 54.

At a second end, actuator cable 78 is wound about second portion 64. The amount of actuator cable 78 wound about second portion 64 is a sufficient amount to provide an angular displacement to pulley system 54 which will cause cover 86 to travel completely across opening 40 as pulley system 54 is rotated. Retainment groove 70 receives and retains actuator cable 78. Actuator cable 78 is fixablly attached at the second end to second portion 64, preferably within groove 70.

Actuator 72 selectively activates actuator mechanism 74. In an exemplary embodiment, actuator is electronically powered and includes a solenoid to facilitate operation thereof. In an alternative embodiment, actuator 72 is pyrotechnically powered where a selectively occurring pyrotechnic reaction activates and powers actuator mechanism 74.

Actuator mechanism 74, when activated by actuator 72, draws actuator cable 78 toward and into actuator 72 at a predetermined rate. In so doing, the second end of actuator cable 74 is unwound from second portion 64, and accordingly, pulley system 54 is rotated.

Sensor/processor 76 monitors various conditions of vehicle 10. For example, sensor/processor 76 monitors acceleration and deceleration of vehicle 10. Also, sensor/processor 76 monitors positioning of vehicle 10 relative axes X—X, Y—Y, and Z—Z of FIGS. 1 and 2.

The conditions are supplied to sensor/processor 76 by a plurality of accelerometers and sensors 77, positioned around vehicle 10. Sensor/processor 76 compares monitored conditions with preset values stored in a memory. If the values are reached or conflicted with, sensor/processor 76 generates a signal and communicates the signal to actuator 72. Upon receiving the signal, actuator 72 activates actuator mechanism 74.

Sensor/processor 76 is preferably located underneath the driver seat as well as other locations such as in close proximity to the front windshield, the front bumper. Sensor/processor 76 detects angular displacement of the vehicle. A preferred location of sensor processor 76 is one that is not too far outboard or from the center of gravity of the vehicle.

Cover deployment assembly 50 also includes drive cables 80. In an exemplary embodiment, assembly 50 includes two drive cables 80. At a first end, drive cables 80 are fixably attached to first portion 56 of pulley system 54.

Drive cables 80 are received and retained within retainment groove 62 of portion 56 and attached therein to edge 60. In another embodiment, the first end of cables 80 are attached to first portion 56 within groove 62 and then wound a predetermined number of times about pulley system 54. In such an embodiment, the drive cables are wound about first portion 56 in a direction opposite to the winding of actuator cable 78 about second portion 64.

Drive cables 80 extend from pulley system 54. The cables are then subjected to a plurality of cable guides 82. Various cable guides 82 are shown in FIGS. 10–14.

Cable guides 82 essentially guide and direct drive cables 80 about roof 20. Cable guides 82 have cable passageways 84 formed therethrough for receiving and guiding cables 80.

Alternatively, cable guides 82 are contoured protuberances which have shaped side edges for guiding cables 80. In yet another embodiment, guides 82 are posts or pulleys about which drive cables 80 are located. Further still, it is within the contemplated scope of the present invention that cable guides 82 be tubes mounted on or grooves formed within roof 20 allowing controlled passage of drive cables 80.

Referring again to FIGS. 1–9, cable guides 82 direct drive cables 80 from pulley system 54 and around opening 40 to cable rails 84. Cable rails 84 extend along a length of opening 40.

Cover deployment assembly 50 preferably includes two cable guides 84, a first guide 84 proximate side 22 and a second guide 84 proximate side 24. Cable guides 84 provide a means for ensuring the accurate disposition of drive cables 80 within cover deployment assembly 50. Cable guides 84 promote high-speed passage of cables 80 therethrough upon activation of actuator mechanism 74 by actuator 72.

In one embodiment, cable guides 84 are channels disposed at the interior of roof 20. In another embodiment, cable rails 84 are grooves or passageways formed in roof 20. Drive cables 80 are located within and pass through the various cable rails 84 upon actuation of actuator mechanism 74.

As mentioned above, the first end of drive cables 80 are fixably attached to pulley system 54. A second end of cables 80 passes through cable rails 84 and is attached to a deployable cover 86.

Deployable cover 86 is essentially a retractable member which may be positioned in a retracted state, a partially deployed state, or a fully deployed state.

When positioned in a retracted state, cover 86 is stored in a storage housing 88 and opening 40 is exposed. However, when cover 86 is positioned in the deployed state, opening 40 is blocked by cover 86.

Cover 86, more specifically, is a foldable or compressible element which is selectively deployed across opening 40 or retracted into and stored within a storage housing 88. Storage housing 88 is positioned intermediate to the interior trim of the vehicle and the exterior surface of the vehicle. Storage housing 88 has an opening through which cover 86 is deployed. Cover 86 includes a lead edge 90 and an opposing fixed edge 92.

Lead edge 90 is located proximate opening 40. Lead edge 90 is the first edge of cover 86 to cross opening 40 when the cover is deployed. Lead edge 90 includes a lead member 94 disposed there at. Lead member 94 extends across lead edge 90 and serves as a point of attachment for the second end of drive cables 80. The second end of drive cables 80 is attached to lead edge 90 at either end, thus, as cables 80 are retracted by pulley system 54 cover 86 deploys across opening 40.

Fixed edge 92 is formed on cover 86 opposite lead edge 90. Fixed edge 92 is secured to storage housing 88. Alternatively fixed edge 92 is secured to roof 20.

Storage housing 88 is disposed in the interior of roof 20, proximate opening 40, opposite pulley system 54. Thus, fixed edge 92 is located and secured proximate opening 40, opposite pulley system 54. For example, storage housing 88 and fixed edge 92 may be located between opening 40 and front end 14.

Figure 15:
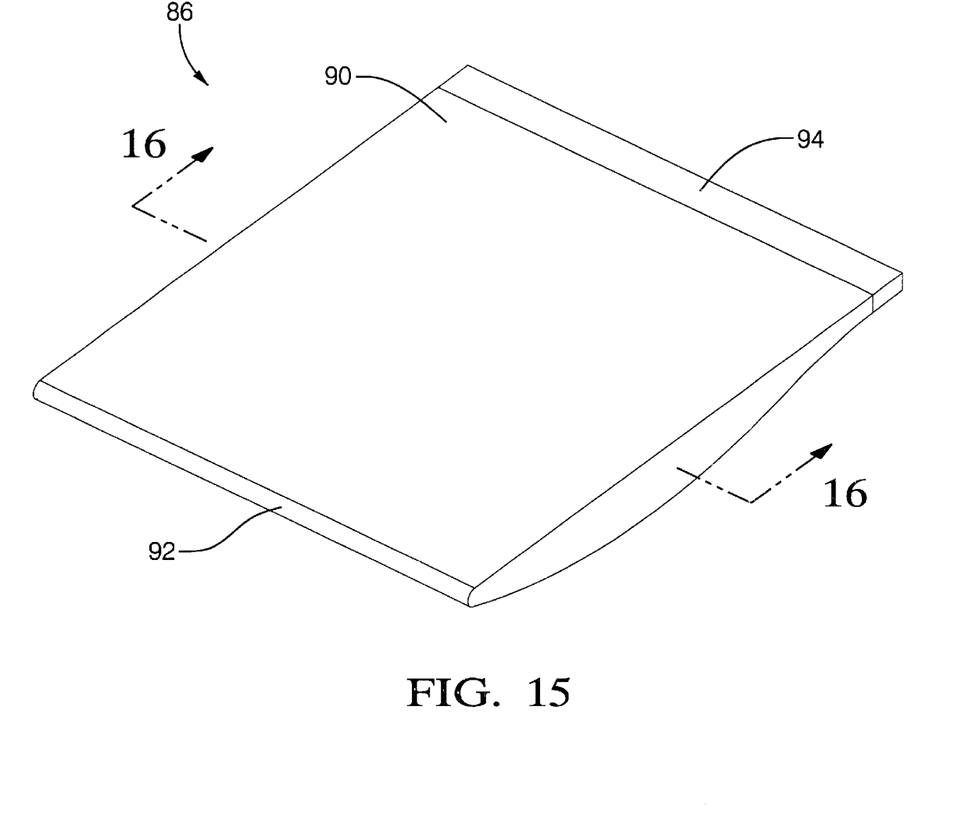
FIG. 15 is a perspective view of a deployable cover in one embodiment of the present invention.
Figure 16:
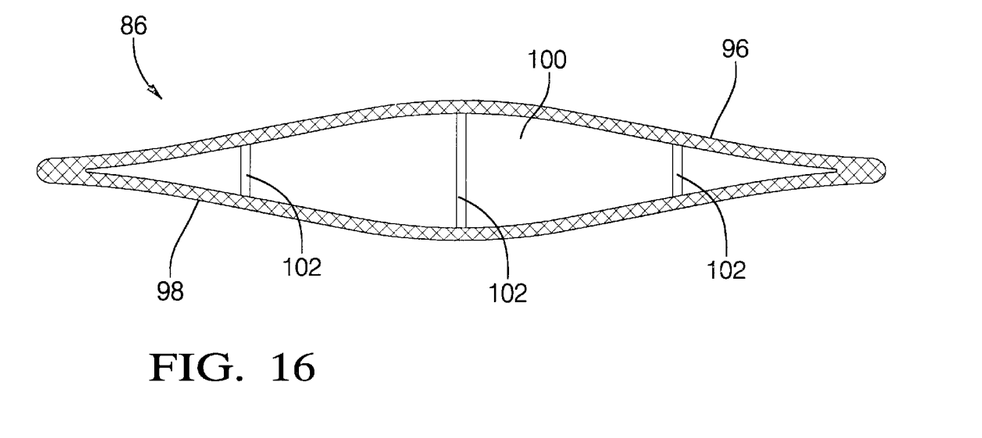
FIG. 16 is a cross-sectional view of the deployable cover of FIG. 15 at an axis B—B.

In an exemplary embodiment, deployable cover 86 is constructed of sealed fabric, as shown in FIGS. 15 and 16. In this embodiment, cover 86 is formed of a continuous fabric having an upper portion 96 and an opposing lower portion 98. Upper and lower portions 96 and 98 form an opening 100 at an interior of cover 86. Tethers 102 are disposed within opening 100, connected and lending support to upper and lower portions 96 and 98. Tethers 102 allow cover 86 to expand as it is being inflated. In addition, tethers 102 also defined a limit of expansion for cover 86. It is, of course, contemplated that cover 86 may have alternative configurations other than those illustrated herein.

Of course, and in an alternate embodiment, sealed fabric deployable cover 86 may be constructed of a plurality of fabric elements fused together to form upper and lower portions 96 and 98.

Figure 8:
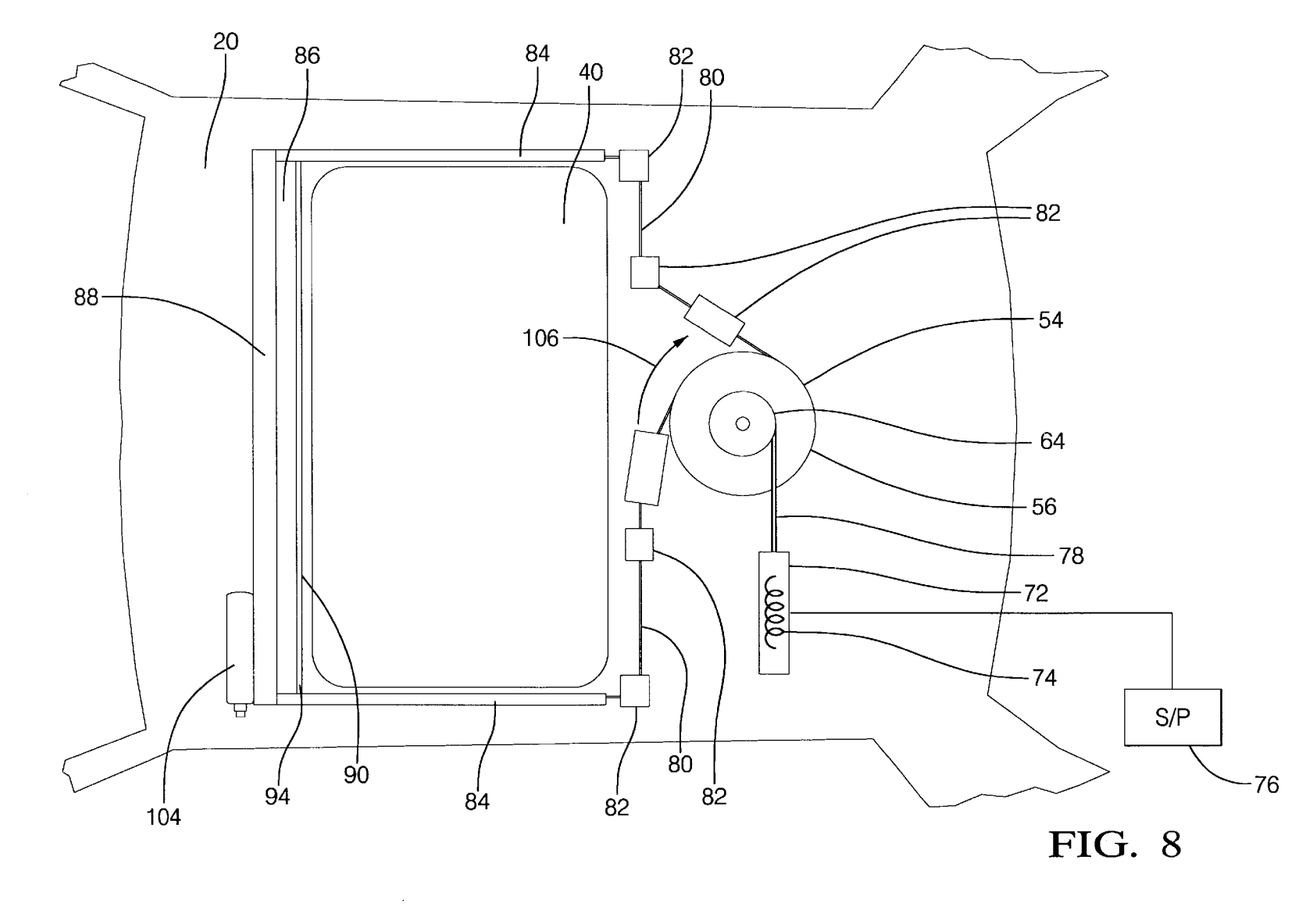
FIG. 8 is a schematic view of the cover deployment assembly of FIG. 4.

Deployable cover 86 is an inflatable enclosure capable of being inflated by gas upon deployment. With reference to FIGS. 8, 15, and 16, cover deployment assembly also includes an inflator mechanism 104 disposed at the interior of roof 20. Inflator 104 is located proximate to storage housing 88 and, more particularly, to fixed end 92 where inflator 104 is in fluid communication with the inflatable enclosure of cover 86 and connectively engaged with cover 86.

Inflator 104 is also communicatively connected with sensor/processor 76. Thus, inflator 104 is activated by sensor/processor 76. Sensor/processor 76, as mentioned above, monitors particular conditions of vehicle 10 and, upon monitoring certain predetermined conditions, signals actuator 72 to initiate the actuator mechanism 74. Correspondingly, upon detection of the certain predetermined conditions, sensor/processor 76 also generates and sends a signal to inflator 104. Upon receiving the signal, inflator 104 activates on a predetermined timing and inflates the cover with gas.

Figure 20:
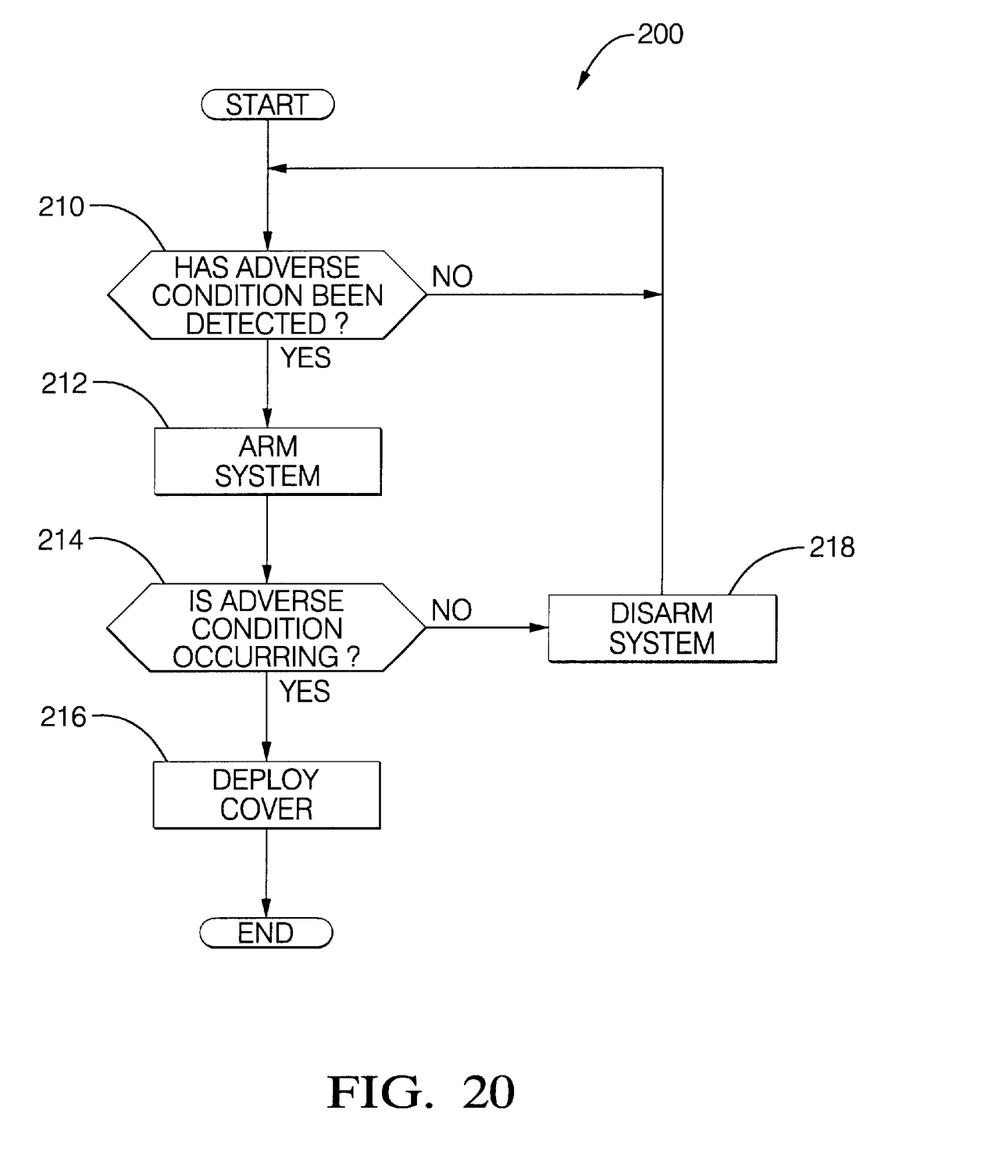
FIG. 20 is a flowchart illustrating portions of a command sequence of a control algorithm.

Referring now to FIG. 20, a portion of a command sequence 200 of a control algorithm for activating the deployable cover in response to signals received from sensors 77 and sensor/processor 76 is illustrated. Here a first decision node 210 determines whether an adverse condition has been detected. If so, a command step 212 instructs the system to arm (i.e. prepare for deployment) alternatively if no adverse condition is detected the system remains in a ready status.

A second decision node 214 determines whether the adverse condition is occurring, if so, a command step 216 instructs the cover to be deployed and inflated. Alternatively, and if the adverse condition does not occur a command step 218 instructs the system to disarm.

Decision node 214 provides a secondary feature in which the system will deploy in the event of an occurrence of an adverse condition. It is, of course, contemplated that the system can operate with a single step command sequence wherein decision node 214 and command step 212 are removed and command steps 216 and 218 are coupled to the outputs of decision node 210.

Inflator 104 is a standard low output inflator capable of receiving the signal from sensor/processor 76 and inflating deployable cover 86. Of course, other types of inflators are contemplated for use with the present invention.

Yet, in another embodiment, inflator 104 does not communicate with sensor/processor 76. Instead, inflator 104 is mechanically connected to cover 86 such that upon deployment of the cover, inflation is mechanically initiated.

Figure 2:
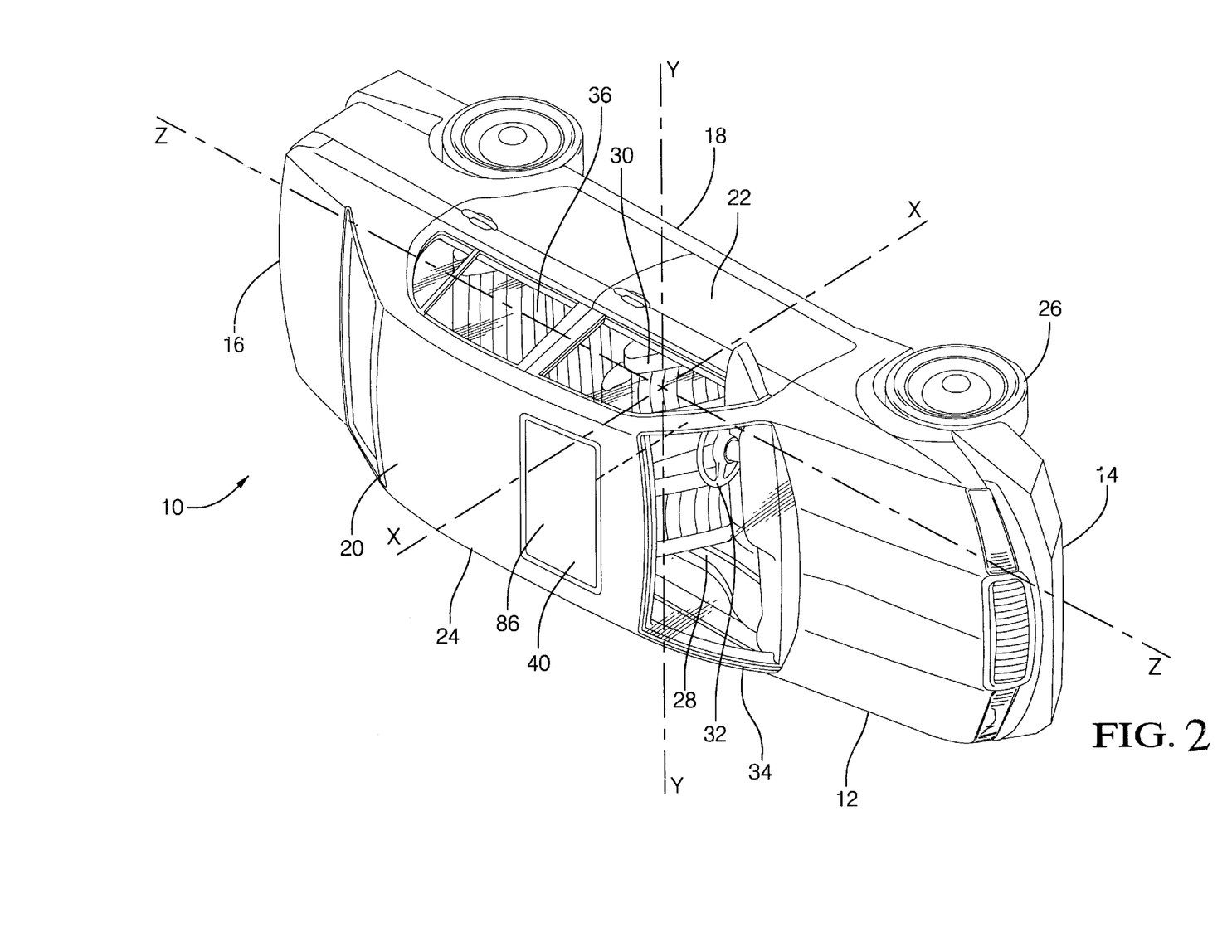
FIG. 2 is a perspective view of the vehicle of FIG. 1 in a second position.
Figure 3:
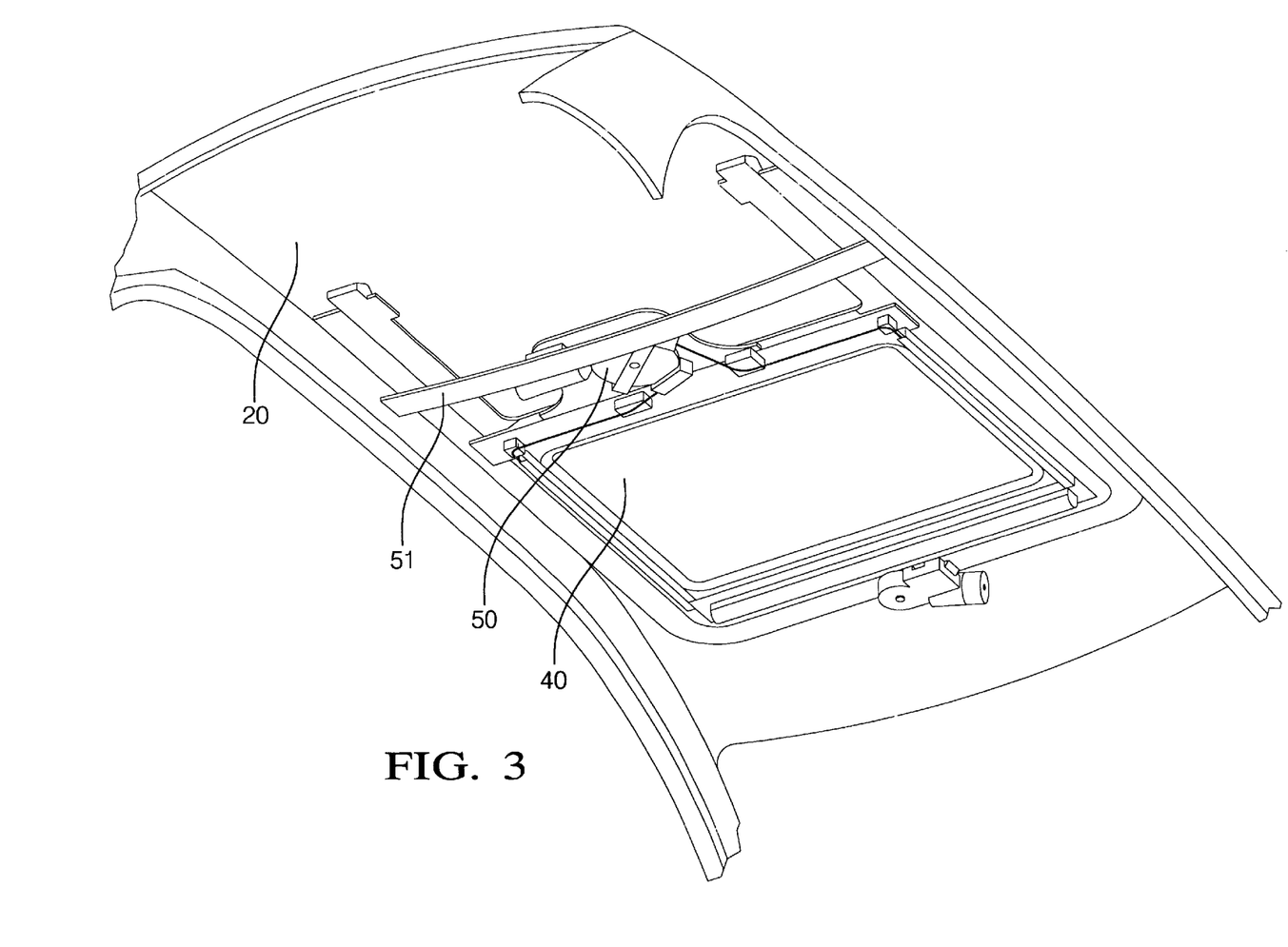
FIG. 3 is a perspective view of a cover deployment assembly in one embodiment of the present invention.
Figures 4, 5:
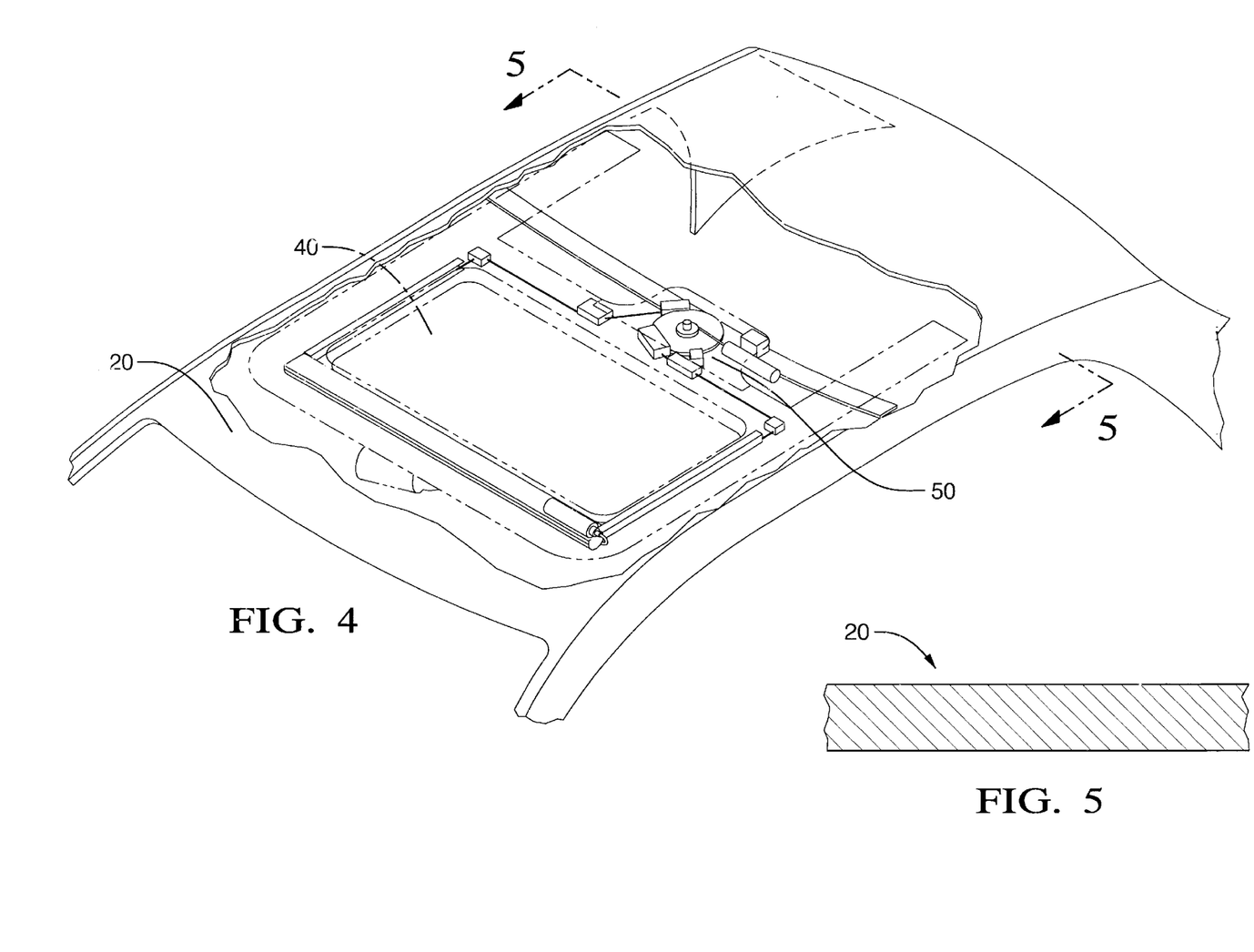
FIG. 4 is a perspective view of the cover deployment assembly of FIG. 3.
FIG. 5 is a cross-sectional view of a vehicle roof of FIG. 3 at an axis A—A.
Figure 17:
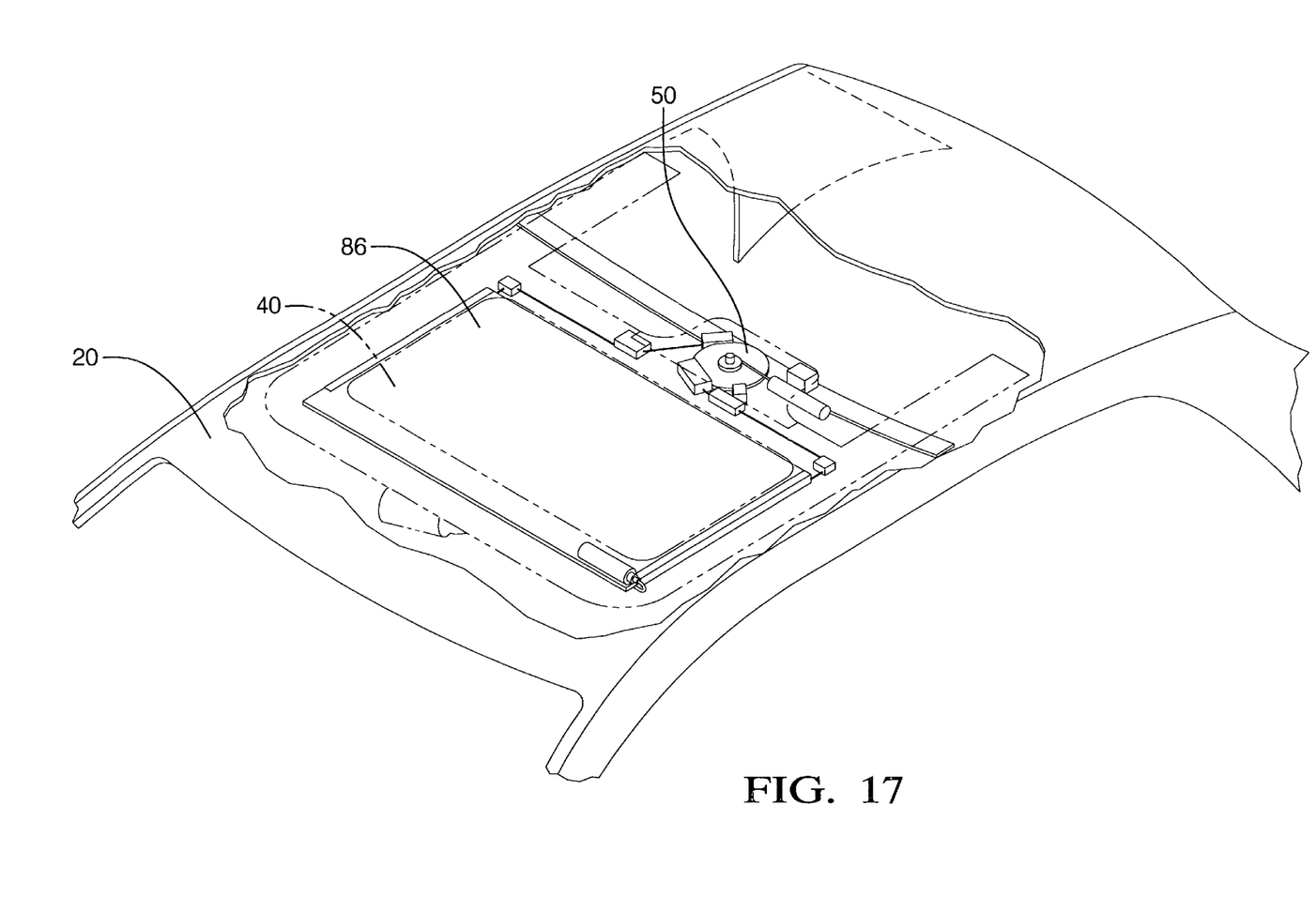
FIG. 17 is a perspective view of the cover deployment assembly of FIG. 4 with a cover fully deployed.

In the deployed state, cover 86 blocks opening 40 entirely as can be seen in FIGS. 2, 17, and 18. That is, when cover 86 is fully deployed, pathway 44 is fully impeded. Upon full deployment, lead member 94 is located within opening 40 at a side opposite fixed edge 92. When inflated and deployed, cover 86 provides a cushioned cover of opening 40.

Now, referring to FIGS. 1–18, the operation of cover deployment assembly 50 will be discussed.

Sensor/processor 76 monitors select operational conditions of vehicle 10. The processor compares collected data with stored predetermined values. Based upon this comparison, sensor/processor 76 selectively generates a signal and communicates the signal to actuator 72. For example, sensor/processor 76 may monitor a rapid deceleration of vehicle 10. The processor compares the deceleration with a stored time value for deceleration. The magnitude of the monitored deceleration surpasses the stored threshold, thus a signal is generated and transmitted to actuator 72 and inflator 104.

Figure 6:
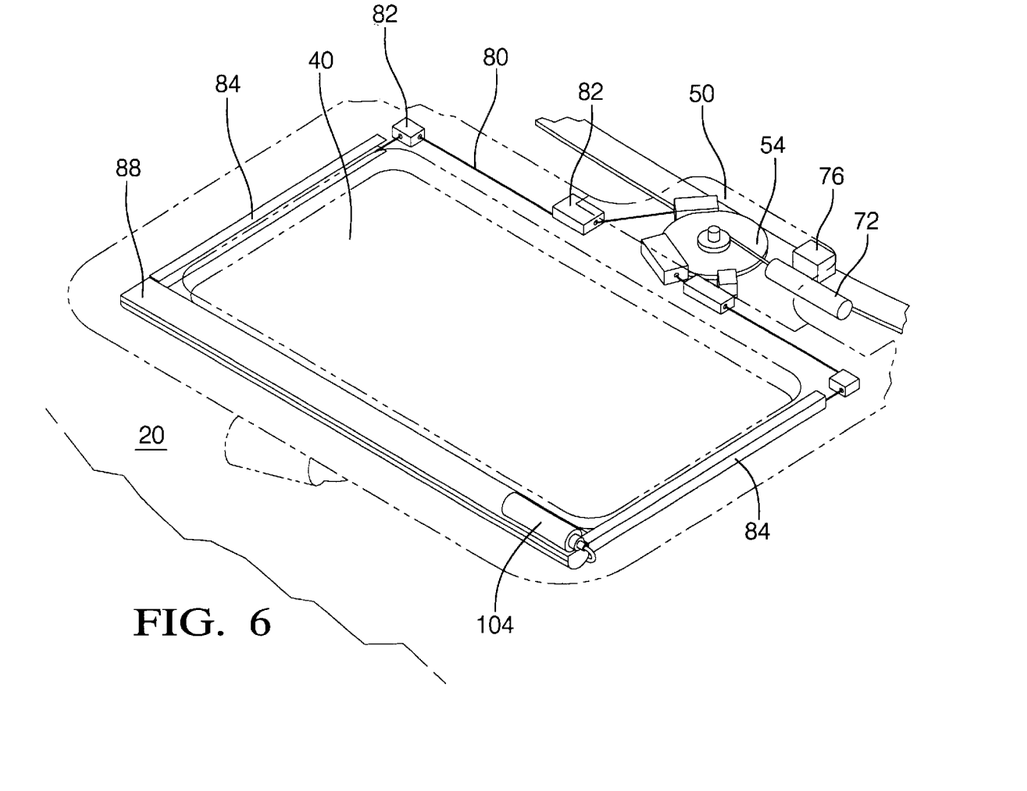
FIG. 6 is an enlarged view of the cover deployment assembly of FIG. 4.
Figure 7:
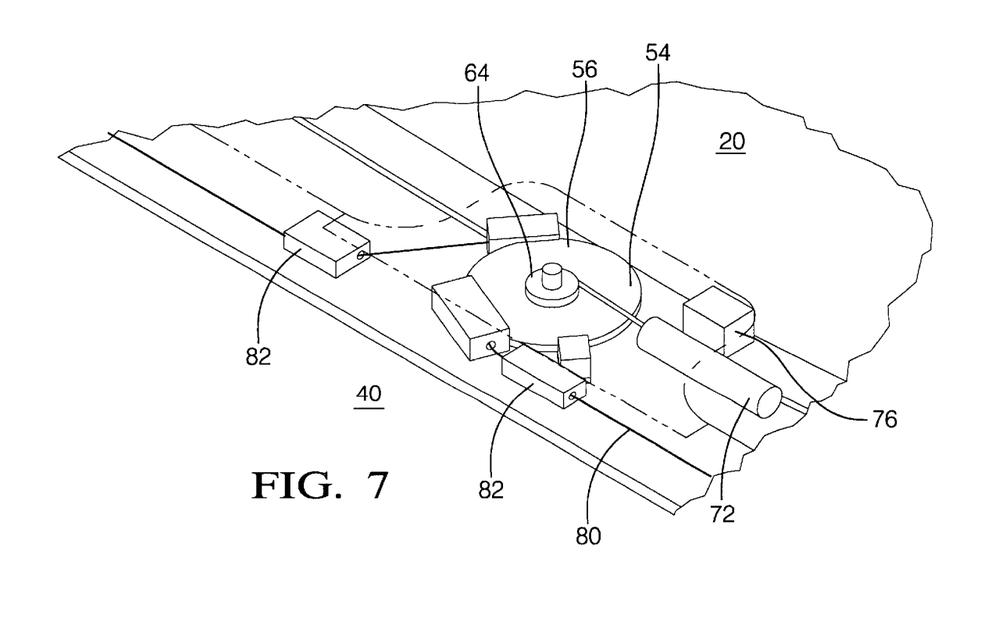
FIG. 7 is another enlarged view of the cover deployment assembly of FIG. 4.

Actuator 72 receives the signal and activates actuator mechanism 74. Actuator mechanism 74 draws actuator cable 78 toward and into actuator 72. The movement of actuator cable 78 relative pulley system 54 causes a tangential force upon second portion 64. As a result, second portion 64 is rotated as the second end of actuator cable 78 is unwound from the second portion. For illustrative purposes, second portion 64 is rotated in a clock-wise direction 106 (FIG. 6).

Since second portion 64 is fixably attached to first portion 56, rotation of the second portion correspondingly results in rotation of the first portion. That is, in gathering actuator cable 78 and rotating second portion 64 in clockwise direction, actuator mechanism 74 also rotates first portion 56 in the clockwise direction.

Due to the difference in diameter of first and second portions 156 and 164, the relative velocities of outer edges 60 and 68 differ. Specifically, in an exemplary embodiment, first portion 56 is larger in diameter than second portion 64, for instance, by a ratio of 4:1. Of course, and as applications may require, this ratio may vary.

Thus, a first point at edge 60 travels a greater translation distance then that traveled in the same time period by a second point similarly located at edge 68. That is to say, the velocity of the first point is greater than the velocity of the second point.

Variously sized first and second portions 56 and 64 allow for a slower movement of less displacement of a point on the second portion to be translated to a relative point on the first portion as a faster movement of greater displacement. The result is rapid winding of drive cables 80 about edge 60 of the first portion.

Rotation of first portion 56 of pulley system 54 causes movement of drive cables 80. Cables 80 pass through and/or about cable guides 82 and cable guides 84 to be wound about edge 60. Such movement of cables 80 results in the corresponding movement of deployable cover 86.

In moving toward pulley system 54, drive cables 80 pull upon lead member 94 of cover 86. Thusly, lead member 94 and, correspondingly, lead edge 90 are rapidly moved across opening 40 until the opening is fully closed and lead member 94 is positioned flush against the side of opening 40 opposite the disposition of fixed edge 92.

Meanwhile, inflator mechanism 104 receives the signal from sensor/processor 76 and a timing sequence is begun. After a predetermined time elapse, inflator 104 initiates inflation of cover 86. The predetermined time elapse, for example, may be the time necessary for lead edge 90 to completely cross opening 40, thus fully covering the opening with deployable cover 86. Although, in another embodiment, inflator 104 may inflate cover 86 simultaneous to the deployment thereof across opening 40. In yet another alternative, inflator 104 provides a means for, either partially or wholly, the deployment of cover 86.

At this point, cover 86 is entirely deployed across opening 40 and fully inflated. Positioned as such, cover 86 provides a cushioned obstruction of pathway 44. Cover 86 when inflated has a sufficient amount of rigidity to cover opening 40.

It will be understood that the above-discussed operation of cover deployment assembly 50 may be designed to function within the confines of a predetermined time period. For example, in a preferred embodiment, the assembly operates such that in a fraction of one second cover 86 is fully deployed and inflated. Of course, assembly 50 may be designed to function faster or slower.

The present invention presents a deployable cover for selectively obstructing an opening. Although cover deployment assembly 50 is discussed herein above with reference to the cable/pulley arrangement including drive cables 80 and pulley system 54, it is conceivable that cover 86 may be deployed by a variety of arrangements. For example, cover 86 may be fitted with retractable rods which extend across opening 40 upon receiving the signal from sensor processor 76, thus positioning cover 86 over opening 40. Alternatively, inflation of cover 86 may be sufficient to deploy cover 86 across opening 40, impeding pathway 44.

It is also contemplated that in accordance with the scope of the present application cover deployment assembly 50 and deployable cover 86 can be fitted to deploy across any opening within a vehicle including but not limited to the following; rear windows, side windows and front windows. In addition, and as applications may require, deployable cover may be constructed out of a translucent material.

Deployable cover 86 has been described as being constructed of a sealed fabric by way of illustration only. Within the scope of the present invention, cover 86 may be plastic or metal. An inflatable cushion may be attached to plastic or metal cover 86 and the cushion may inflate in compartment 28 upon deployment of the cover.

Alternatively, cover 86 may include a first half and a second half, each located at opposing sides of opening 40, each capable of deployment across opening 40, such that, upon deployment of cover 86, the first and second halves meet at a center of opening 40 thus covering the opening.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A deployable member for covering an opening in a vehicle, comprising:

an inflatable structure being stowed in an unexpanded and uninflated state adjacent to a first side of said opening;

a deployment mechanism being stowed adjacent to a second side of said opening;

a connector element disposed connectively between said inflatable structure and said deployment mechanism;

a plurality of guides for guiding said connector element between said deployment mechanism and said inflatable structure, said guides being disposed about said opening; and a pulley assembly rotatably disposed at said second side of said opening, said first side and said second side being located opposite one another and. said connector element being configured to be wound from an undeployed state to a deployed state by said pulley assembly, said deployment mechanism rotates said pulley assembly causing said inflatable structure to be deployed across said opening from said first side to said second side, said inflatable structure being deployed by said pulley assembly prior to the inflation of said inflatable structure.

2. The deployable member as in claim 1, wherein said opening is formed in a roof of said vehicle.

3. The deployable member as in claim 2, wherein said opening defines a sunroof opening in said vehicle.

4. The deployable member as in claim 1, wherein said inflatable structure is attached to a cover member capable of being deployed from a first position to a second position, said cover member being configured to cover said opening when said cover member is in said second position, said cover member being deployed from said first position by said deployment mechanism.

5. The deployable member as in claim 4, wherein an inflator inflates said inflatable structure after said cover member is in said second position.

6. The deployable member as in claim 1, wherein said inflatable structure is constructed out of a resilient material.

7. The deployable member as in claims 6, wherein said resilient material is a material selected from the group consisting of plastic, rubber, and fabric.

8. The deployable member as in claim 1, wherein said deployment mechanism includes an actuator, said actuator being connected to said inflatable structure by said connector element.

9. The deployable member as in claim 8, wherein said connector element comprises a cable.

10. The deployable member as in claim 8, wherein said pulley assembly is rotatably disposed between said actuator and said inflatable structure, said connector element being located about a pulley of said pulley assembly.

11. The deployable member as in claim 8, wherein said pulley assembly comprises a first pulley and a second pulley said connector element comprises a first portion and a second portion, said first portion connectively disposed between said inflatable structure and said first pulley, said second portion being connectively disposed between said second pulley and said actuator.

12. A deployable member for covering an opening in a vehicle comprising:

an inflatable structure being stowed in an unexpanded and uninflated state adjacent to a first side of said opening;

a deployment mechanism being stowed adjacent to a second side of said opening, said second side being in a facing spaced relationship with respect to said first side, said deployment mechanism includes an actuator, said actuator being connected to said inflatable structure by at least one connector element;

an inflator being in fluid communication with said inflatable structure;

a detecting means for detecting a predetermined condition, said detecting means causing said deployment mechanism to deploy said inflatable structure across said opening when said predetermined condition is detected, said detecting means causing said inflator to inflate said inflatable structure after said deployment mechanism has deployed said inflatable structure across said opening; and a pulley system having a first pulley and a second pulley, wherein said connector element comprises a first portion and a second portion, said first portion connectively disposed between said inflatable structure and said first pulley, said second portion being connectively disposed between said second pulley and said actuator, wherein said first and second pulleys are disk shaped, said first and second pulleys being concentrically fixed to one another, and wherein said first pulley has a first diameter and said second pulley has a second diameter, said first diameter being larger than said second diameter.

13. A deployable member for covering an opening in a vehicle comprising:

an inflatable structure being stowed in an unexpanded and uninflated state adjacent to a first side of said opening;

a deployment mechanism being stowed adjacent to a second side of said opening, said second side being in a facing spaced relationship with respect to said first side, said deployment mechanism includes an actuator, said actuator being connected to said inflatable structure by at least one connector element;

an inflator being in fluid communication with said inflatable structure;

a detecting means for detecting a predetermined condition, said detecting means causing said deployment mechanism to deploy said inflatable structure across said opening when said predetermined condition is detected, said detecting means causing said inflator to inflate said inflatable structure after said deployment mechanism has deployed said inflatable structure across said opening; and a pulley system having a first pulley and a second pulley, wherein said connector element comprises a first portion and a second portion, said first portion connectively disposed between said inflatable structure and said first pulley, said second portion being connectively disposed between said second pulley and said actuator, wherein said actuator is configured to gather said second portion, said second portion rotating said second pulley, said second pulley correspondingly rotating said first pulley, said first pulley being configured to gather said first portion, said first portion positioning said inflatable structure across said opening.

14. A deployable member for covering an opening in a vehicle, comprising:

an inflatable structure being constructed out of a resilient material and being capable of being stored in a compacted condition at a housing, said housing being located at a first side of said opening;

an actuator being located at a second side of said opening, connector elements disposed connectively between said inflatable structure and said actuator;

a plurality of guides for guiding said connector elements between said actuator and said inflatable structure, said guides being disposed about said opening;

a pulley assembly rotatably disposed at said second side of said opening, said first side and said second side being located opposite one another and said connector elements being configured to be wound from an undeployed state to a deployed state by said pulley assembly, said actuator rotates said pulley assembly causing said inflatable structure to be deployed across said opening from said first side to said second side, said inflatable structure being deployed by said pulley assembly prior to the inflation of said inflatable structure.

15. The deployable member as in claim 14, further comprising:

an inflator for inflating said inflatable structure, said inflator being in fluid communication with said inflatable structure, said inflator being actuated after said inflatable structure has been deployed across said opening.

16. The deployable member as in claim 15, wherein said inflatable structure includes a plurality of tethers disposed in the interior volume of said inflatable structure, said tethers being configured and positioned to limit the expansion of said inflatable structure as it is inflated by said inflator.

* * * * *